United States Patent
Abdelnour et al.

[11] Patent Number: 6,002,970
[45] Date of Patent: Dec. 14, 1999

[54] METHOD AND APPARATUS FOR INTERFACE DUAL MODULAR REDUNDANCY

[75] Inventors: George Michel Abdelnour; Arthur Latimer Bond; Robert W. Downes; Kenneth H. Potter, Jr., all of Raleigh; Frederick K. Yu, Durham, all of N.C.

[73] Assignee: International Business Machines Corp., Armonk, N.Y.

[21] Appl. No.: 08/950,476

[22] Filed: Oct. 15, 1997

[51] Int. Cl.$^6$ .................................................. G05B 9/02
[52] U.S. Cl. ................................................. 700/82; 714/11
[58] Field of Search .................... 364/187, 131, 364/133, 141, 183, 184; 395/182.09, 182.1, 182.11, 183.2, 183.19; 371/47.1; 714/11, 797, 43, 12, 13, 44

[56] References Cited

U.S. PATENT DOCUMENTS

| | | | |
|---|---|---|---|
| 3,783,250 | 1/1974 | Fletcher et al. | 253/153 |
| 3,991,407 | 11/1976 | Jordan, Jr. et al. | 340/172.5 |
| 4,358,823 | 11/1982 | McDonald et al. | 364/200 |
| 4,562,575 | 12/1985 | Townsend | 371/9 |
| 5,630,046 | 5/1997 | Loise | 395/182.09 |
| 5,689,632 | 11/1997 | Galy et al | 395/182.09 |

Primary Examiner—William Grant
Assistant Examiner—Steven R. Garland
Attorney, Agent, or Firm—Jerry W. Herndon

[57] ABSTRACT

Controller triple modular redundancy is substantially achieved and reliability improved in a system having duplicate controllers that serve peripheral units. Both controllers detect suspected faults in itself and in the other controller. A peripheral unit that suspects a faulty active controller requests a switch of the active controller. A voting circuit processes votes from the controllers and the active controller switch signal from the peripheral units to select the active controller. The signaling paths between the controllers used to convey votes and active controller information are duplicated. The signals on these signaling paths convey information by using oscillating signals of different frequencies.

5 Claims, 5 Drawing Sheets

METHOD AND APPARATUS FOR INTERFACE DUAL MODULAR REDUNDANCY

TECHNICAL FIELD

The invention relates to the field of system reliability and particularly to that area of the field which uses modular redundancy and voting techniques between redundant modules both to detect failures and to determine which of redundant modules is most likely to be faulty. The invention particularly relates to the use of dual modular redundancy, in conjunction with dynamic signaling between modules to achieve fault detection at the interface level, without the necessity of resorting to higher levels of modular redundancy.

BACKGROUND OF THE INVENTION

Experience shows that most failures of electronic components occur at the interfaces between devices, rather than in the interior of the devices. This tends to be true irrespective of whether the device is an integrated circuit chip, a printed circuit board or a system unit. The interfaces between devices include drivers, solder pads, pin connectors and backplane wiring in appropriate cases. These components tend to operate hotter than other components because of the need to carry higher interface signaling currents. Connecting pads on integrated circuits and connecting pins have always been a major source of unreliability. Interface wiring, backplane wiring and the like are often exposed to physical damage from any number of sources.

One known way to increase the reliability of a system is to use triple modular redundancy (TMR) of system devices and to vote on the correct result between the devices. For example, it is known to provide three or more devices, each doing the same thing, and to compare the results from each to detect failures. It is also known to provide TMR in the interface circuits of such devices. For example, it is known to provide three or more sets of signaling drivers, pins, etc. between chips, boards and units. However, such techniques are seldom used because of the expense required for the additional redundancy.

SUMMARY OF THE INVENTION

The invention reduces the expense required to achieve substantially the equivalent reliability of TMR for systems that have only duplicate controllers and for faults that are known to be the most likely to occur, namely faults close to or in the interfaces between devices. In normal operation, one of the controllers is an active controller and the other controller is in standby mode. Both controllers perform the same processing operations substantially in parallel. In addition, one or more peripheral units are connected to the first and second controllers and are served by the active controller. The operation of each controller is monitored to detect a suspected fault condition in either of the controllers. A first signal is generated if a suspected fault condition is detected in the first controller. Similarly, a second signal is generated if a suspected fault condition is detected in the second controller. A peripheral unit can request a switch in the active controller if the peripheral unit suspects that the active controller may be faulty. For example, a timeout failure of the active controller to respond to a request for service from a peripheral unit may give rise to such a suspicion. A voting circuit performs a majority vote on the first, second and third signals to select the active controller.

In the preferred embodiment, the voting circuit that actually selects the active controller is in one of the controllers, while the other controller has a similar voting circuit for casting its vote to the voting circuit in the controller that selects the active controller. This saves some amount of circuitry. However, it will be clear to a skilled artisan that it is equally satisfactory to have identical circuits in both controllers for casting votes and a voting circuit separate from either controller for selecting the active controller.

In accordance with another feature of the invention, selected interface components are duplicated. In the preferred embodiment, the duplicated components include the interface signaling paths between the controllers used for casting votes and conveying the identity of the active controller. The duplicated components might also include the connecting pins or pads to the signaling paths and the interface drivers that terminate the signaling paths.

In addition, the operative signals on the signaling paths are required to be non-static for conveying information. Predefined values of a signal attribute are used to convey different signal states. For example, pulsing or oscillating signals of different predetermined frequencies can represent different operative conditions or votes, whereas a static signal, because it is an invalid state, represents a failure of some kind. The following rules are used to interpret the states on duplicate signaling paths which use non-static signaling. Signals that are static on both duplicate paths are treated as a failure of the device that is generating the signals. A signal on either of the duplicate signaling paths that does not match a predefined value of the attribute is ignored.

It can be shown that the above arrangement approximates the reliability of a system employing triple modular redundancy at approximately two-thirds of the cost.

DETAILED DESCRIPTION

Figure 1:
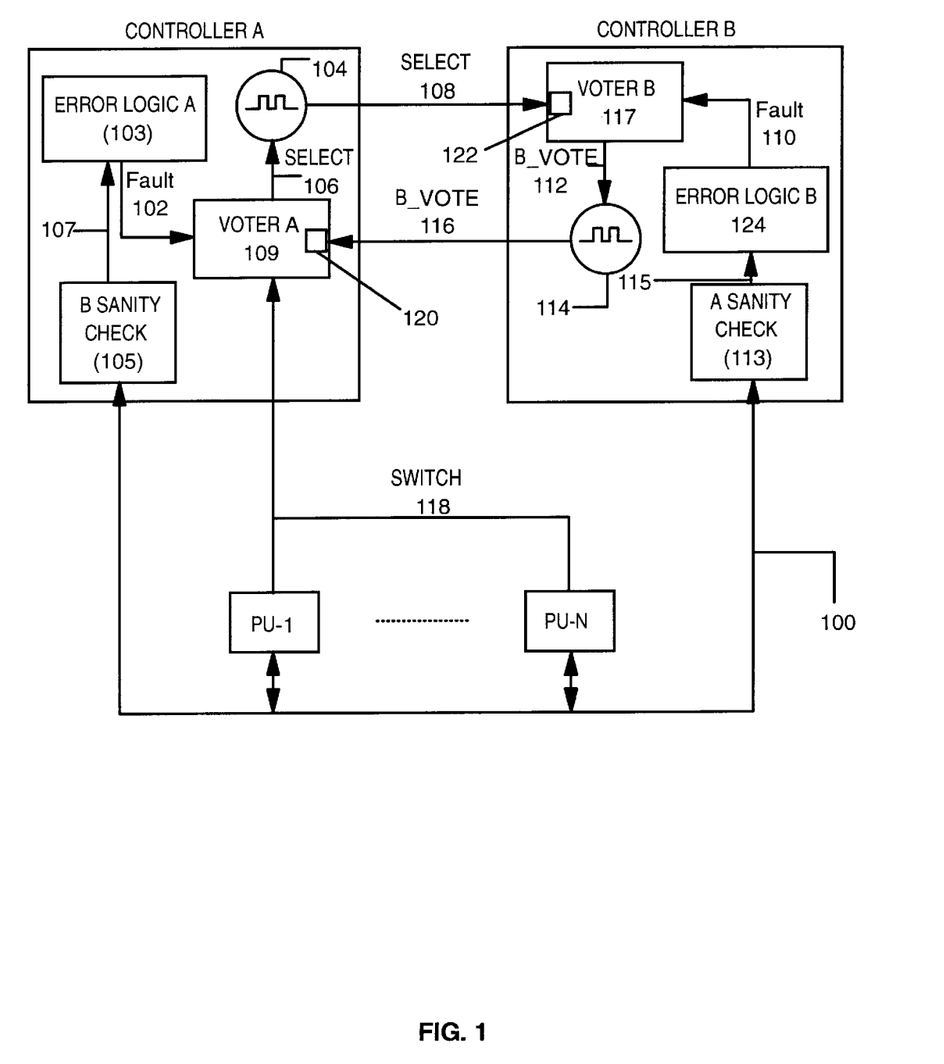
FIG. 1 shows a block diagram of the preferred system having two controllers A and B, a plurality of peripheral units that are served by the active controller, and circuits within each controller for detecting suspected faults of the controllers and for processing votes from each controller and the peripheral units to select an active controller.

FIG. 1 shows an illustrative system in which dual modular redundancy is employed to achieve the equivalent of triple modular redundancy at the interface points between devices. This illustrative system comprises dual controllers labeled as controller A and controller B. The system of FIG. 1 also contains a number of peripheral units (PU) labeled as PU-1 through PU-N. These peripheral units may represent any of a number of different types of devices such as printers, disks, etc. or they might be adapters imbedded in slots in the controllers and used for communicating with other peripheral devices. In this illustrative example, peripheral units PU-1 through PU-N communicate with each of controllers A and B via a common bus 100 for normal data processing operations.

Each controller contains processing circuits for performing various processing operations typical of a controller or processor. However, for purposes here, these operations are unimportant and details related to these operations are not shown or discussed. Each of the controllers contain circuitry for detecting various types of malfunctions within itself as well as within the other controller. In controller A, this circuitry is identified as ERROR LOGIC A (103) and similarly as ERROR LOGIC B (124) in controller B. In controller A, a circuit called B Sanity Check circuit 105 detects malfunctions of controller B and reports these malfunctions to ERROR LOGIC A via connection 107. Similarly, in controller B, the circuit A Sanity Check 113 detects controller A malfunctions and reports them to ERROR LOGIC B (124) via connection 115. By way of example, it is assumed in FIG. 1 that the detection of malfunctions of a controller by the other controller is performed by the transmittal of sanity check messages via bus 100 between the controllers. For example, if controller A is functioning properly, then periodically (within a guaranteed interval) it transmits a sanity message to controller B. Controller B performs the same type of operation to transmit sanity messages to controller A. If the guaranteed interval expires in either controller without the receipt of a sanity check message from the monitored controller, this causes the sanity check circuit in the monitoring controller to send a signal on the appropriate connection 107 or 115 to its ERROR LOGIC circuit 103 or 124, respectfully, to signal the detection of a malfunction in the other controller. The use of bus 100 to transmit these sanity check messages is arbitrary. Separate connections could be used. Other types of sanity checking could be used as well. For added reliability between the interface points, a pulsed signaling scheme could be used on bus 100 that is similar to that discussed below for other inter-controller connections.

Each controller also contains a voting circuit identified as VOTER A (109) and VOTER B (117), respectively. The voting circuits in each of the controllers are slightly different and these differences are discussed at appropriate points below.

For the purpose of reliability and voting, each ERROR LOGIC circuit A and B communicates with the voting circuit in its respective controller as well as with the voting circuit in the other controller. For example, ERROR LOGIC A sends a signal FAULT 102 to its VOTER A circuit to indicate that a suspected fault condition has been detected in controller A. As long as ERROR LOGIC A does not detect any malfunction within controller A, the state of the FAULT 102 signal effectively indicates a vote by ERROR LOGIC A for controller A to be the active controller. VOTER A communicates via a connection SELECT 106 with a pulse generator 104 in controller A, which in turn sends a pulsing signal via connection SELECT 108 to VOTER B in controller B. The signals on lead SELECT 106 and the resulting pulsing signal on SELECT 108 represent which controller is the active controller, as discussed below. Similar connections exist in controller B, such as FAULT 110 between ERROR LOGIC B and VOTER B, and connection B_VOTE 112 from VOTER B 117 to pulse generator 114 controller B. The pulse generator 114 sends pulsing signals to VOTER A in controller A via interprocessor connection B_VOTE 116. Each of the peripheral units PU-1 through PU-N may also send a signal on lead SWITCH 118 to request a switch of the active controller in the event any one of the peripheral units detects a malfunction of the active controller, such as not responding to a request for service.

The SELECT 108, B_VOTE 116 and SWITCH 118 signals form the basis for the voting scheme of this invention. In the illustrative system, one of the controllers A or B is the active controller and the other is in a standby mode, ready to take over as active in the event of malfunction by the active controller. The SELECT signal 108 from controller A to controller B indicates which controller is in the active mode. The B_VOTE 116 from controller B to controller A is used to request which controller B thinks should be active. A signal on SWITCH 118 is issued by a peripheral unit to request a change in the active processor when the peripheral unit believes that the active processor is malfunctioning.

In this illustrative system, controller A initially assumes the active role by default. Ordinarily, when controller A is active and no controller is malfunctioning, ERROR LOGIC A votes for controller A to be active by sending a signal on FAULT 102; ERROR LOGIC B votes for controller A to be active by its signal on B_VOTE 116 and the peripheral units do not request any change in active processor status. If ERROR LOGIC A detects a malfunction in controller A, it votes for controller B to become active by changing the signal on FAULT 102. If controller A determines that controller B is malfunctioning, then irrespective of what it believes about itself, controller A will maintain its vote for itself to remain active. Similar operations are performed in controller B.

In addition, in accordance with the invention, oscillating or pulsing signals rather that stable voltage levels are used for the intercontroller signals SELECT 108 and B_VOTE 116. This is an important feature of the invention that allows the emulation of triple modular redundancy with essentially dual modular circuitry, as will be seen. In the preferred embodiment, the SELECT 108 signal is pulsed with frequency shift keying (FSK). The keying is arranged to provide a pulse stream with two different possible pulsing frequencies to convey which controller A or B is active. The operating frequencies can be chosen based on convenience. For example, it may be convenient to divide the controller clock by different values to obtain the two different frequencies. Similarly, FSK keying with two possible frequencies is used for intercontroller signal B_VOTE 116 to convey controller B's vote to controller A.

The SWITCH 118 signal from the peripheral units PU-1 through PU-N is an open collector driven signal which is sourced by each of the PU's. This means that the state of the signal is high only if all of the PU's holds it high, which is the no-fault detected state. If any PU determines that the active controller is malfunctioning, that PU can force the state of the SWITCH 118 signal to a low state. The PU's do not know or care which controller is active. A low state merely signals a vote from at least one of the peripheral units for a change in the active controller. A PU may conclude that the active controller is malfunctioning for a number of reasons, such as a request for service which is not honored by the controller within a specified timeout period.

In operation, each controller votes for the controller it thinks should be active. For example, a controller might vote for itself to be active if it is currently in stand-by mode and detects, via the SELECT 108 signal or the B_VOTE 1 16 signal, whichever is appropriate, that the other controller is malfunctioning, or if it is standby and the active controller votes for it to become active simultaneously with a PU request on SWITCH 118 to switch the active processor. Similarly, an active controller (say A) may vote for the other controller (say B) to assume the active mode if controller A and a peripheral unit or controller B and a peripheral unit vote it out of active mode.

In controller A, the inputs to VOTER A 109 are the FAULT 102 signal from ERROR LOGIC A (103), a signal on bus SWITCH 118 from the peripheral units PU-1 through PU-N and a signal on lead B_VOTE 116, which represents controller B's vote for the active controller. In generating the signal FAULT 102, ERROR LOGIC A (103) uses internal circuitry to monitor error conditions within controller A and a signal on lead 107 from the B SANITY CHECK circuit 105. As mentioned above and by way of example, the signal on lead 107 reflects a controller B OK condition as long as controller A receives periodic messages from controller B on bus 100.

Figures 2, 3:
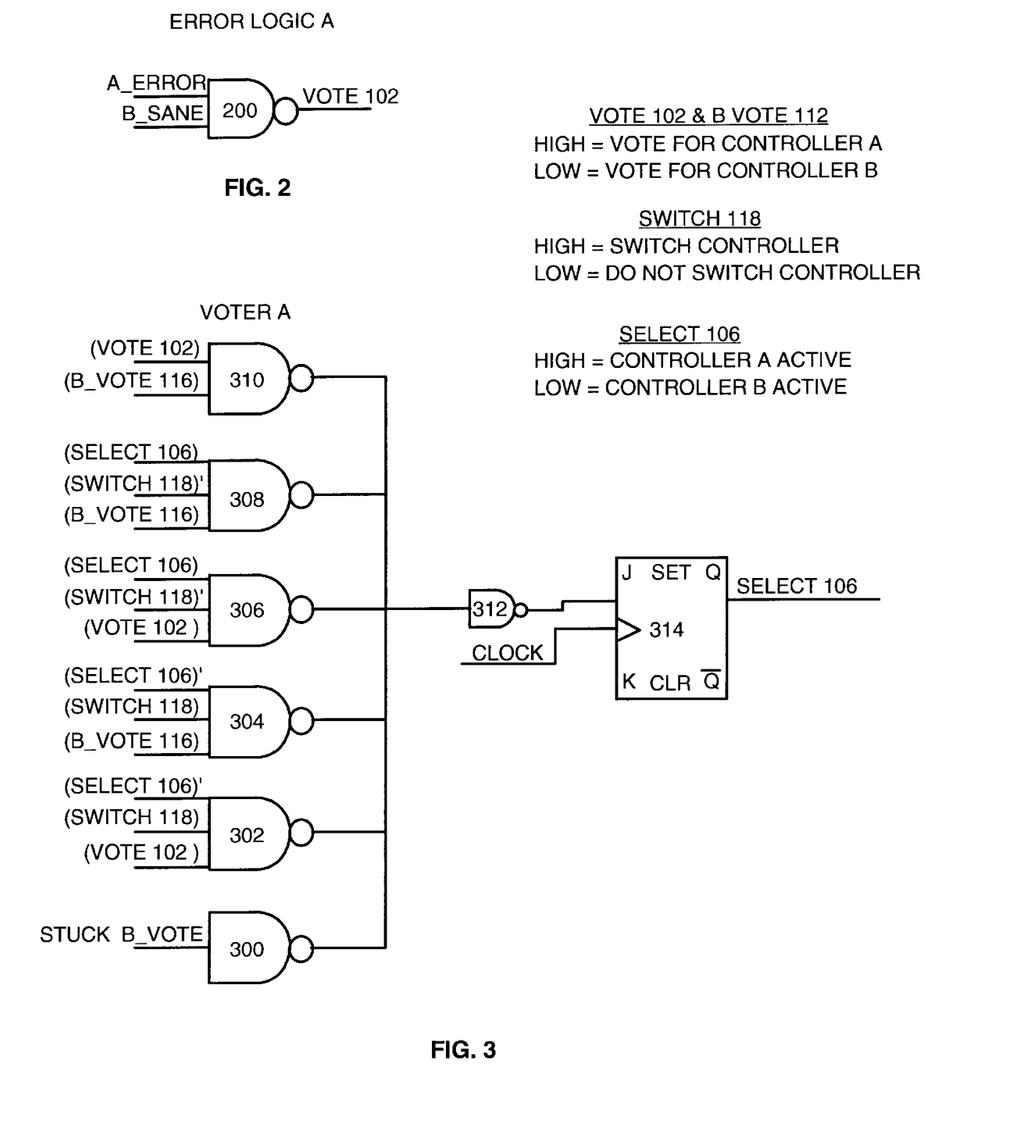
FIGS. 2 through 5 show logic diagrams of various of the controller circuits shown in FIG. 1.

A simplified diagram of ERROR LOGIC A 103 is shown in FIG. 2. This simplified circuit consists of a single NAND gate 200. The signal on one input A_ERROR of NAND gate 200 is normally low and becomes high if controller A detects an error condition within itself. The circuitry and types of error conditions that are reflected by the state of A_ERROR can be any of many types of error conditions well known in the art. The types of error condition detection that might be implemented in any system incorporating the invention are not germane to the invention and are not discussed in detail. The signal B_SANE on the second input of NAND gate 200 is high when controller A considers controller B to be functioning properly, as reflected by the signal on lead 107 from B SANITY CHECK 105. Thus, whenever controller A considers itself to be functioning normally, A_ERROR is low and the output of NAND gate 200 ( FAULT 102) is high, reflecting a controller A vote for itself irrespective of the condition of the signal on B_SANE. Similarly, the output of NAND gate 200 is high, representing a controller A vote for itself whenever the input signal B_SANE is low. FAULT 102 is low, representing a controller vote for controller B to be active, only when controller A considers itself to be functioning improperly (A_ERROR high) and controller B to be functioning properly (B_SANE high).

Figure 4:
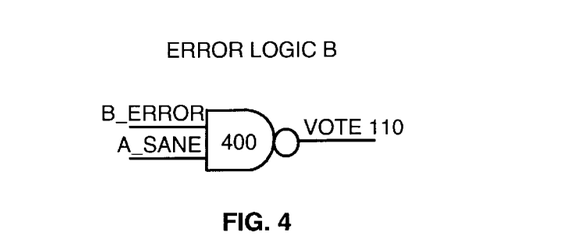

ERROR LOGIC B in controller B, shown in FIG. 4, is identical in structure to ERROR LOGIC A, except that the input leads B_ERROR and A_SANE are the counterparts of those in ERROR LOGIC A.

FIG. 3 shows the details of VOTER A 109. Recall that the signals on interface leads SELECT 108 and B_VOTE 116 are pulsed signals that oscillate at two different rates to determine whether the signal is considered to be high or low. Therefore, a steady-state condition of any level on these interface leads is considered to be a fault condition. In controller A, pulse detector 120 of VOTER A 109 detects whether or not B_VOTE 116 contains a valid pulsing signal. If this signal is not pulsing at one of the two valid defined rates, then pulse detector 120 generates an internal signal STUCK B_VOTE (shown in FIG. 3). Similarly, pulse detector 122 in VOTER B of controller B performs the same function for the signals on lead SELECT 108 and generates an internal signal STUCK SELECT (shown in the VOTER B details of FIG. 5) if a valid pulsing condition is not found on lead SELECT 108. As a default condition, whenever controller A detects a stuck condition on B_VOTE 116, VOTER A forces controller A to be the active controller irrespective of any other vote. Similarly, when VOTER B detects a stuck condition on SELECT 108, it causes the vote from VOTER B that appears on B_VOTE 112 and B_VOTE 116 to represent a vote for controller B to be active, irrespective of any other condition in controller B.

In FIG. 3, NAND gate 300 implements the default condition described above for stuck conditions detected on interface lead B_VOTE 116. Specifically, if STUCK B_VOTE is high indicating a fault somewhere in the edge interface circuitry of the pulse generator 114 of controller B or the pulse detecting circuitry of pulse detector 120 of controller A (or the interface bus carrying B_VOTE 116), the output of NAND gate 300 causes flip-flop 314 to be set, which in turn establishes SELECT 106 at a high level and selects controller A. The remaining circuitry of FIG. 3 implements the voting operations of VOTER A according to the truth table of Table 1:

TABLE 1

| SELECT 106 (Present State) | FAULT 102 (controller A) | B_VOTE 112 | SWITCH 118 | SELECT 106 (Next State) |
|---|---|---|---|---|
| A | A | A | NO | A |
| A | A | B | NO | A |
| A | A | A | YES | A |
| A | A | B | YES | B |
| A | B | A | YES | B |
| A | B | B | NO | B |
| A | B | B | YES | B |
| B | B | B | NO | B |
| B | B | A | NO | B |
| B | B | B | YES | B |
| B | B | A | YES | A |
| B | A | B | YES | A |
| B | A | A | NO | A |
| B | A | A | YES | A |
| A | B | A | NO | A |
| B | A | B | NO | B |

Truth table 1 can be summarized as follows. NAND gate 302 forces controller A to become active when controller B is presently active (SELECT 106)' and controller A is voting for itself (FAULT 102) simultaneously with a request (SWITCH 118) from a peripheral unit to switch the active processor. NAND gate 304 forces controller A active when controller B is presently active (SELECT 106)' and a peripheral unit requests a switch in the active processor (SWITCH 118) simultaneously with a vote from controller B (B_VOTE 116) to make controller A active. NAND gate 306 maintains controller A in the active state when it is already active (SELECT 106), ERROR LOGIC A has not detected any error within controller A (FAULT 102) and no peripheral unit is requesting a processor switch (SWITCH 118)'. Similarly, NAND gate 308 maintains controller A in the active state when it is already active (SELECT 106), controller B is voting for controller A to be active (B_VOTE 116) and no peripheral unit is requesting a processor switch (SWITCH 118)'. NAND gate 310 forces controller A to be active whenever both controller A and controller B are voting for controller A to be active (FAULT 102 and B_VOTE 116).

Figure 5:
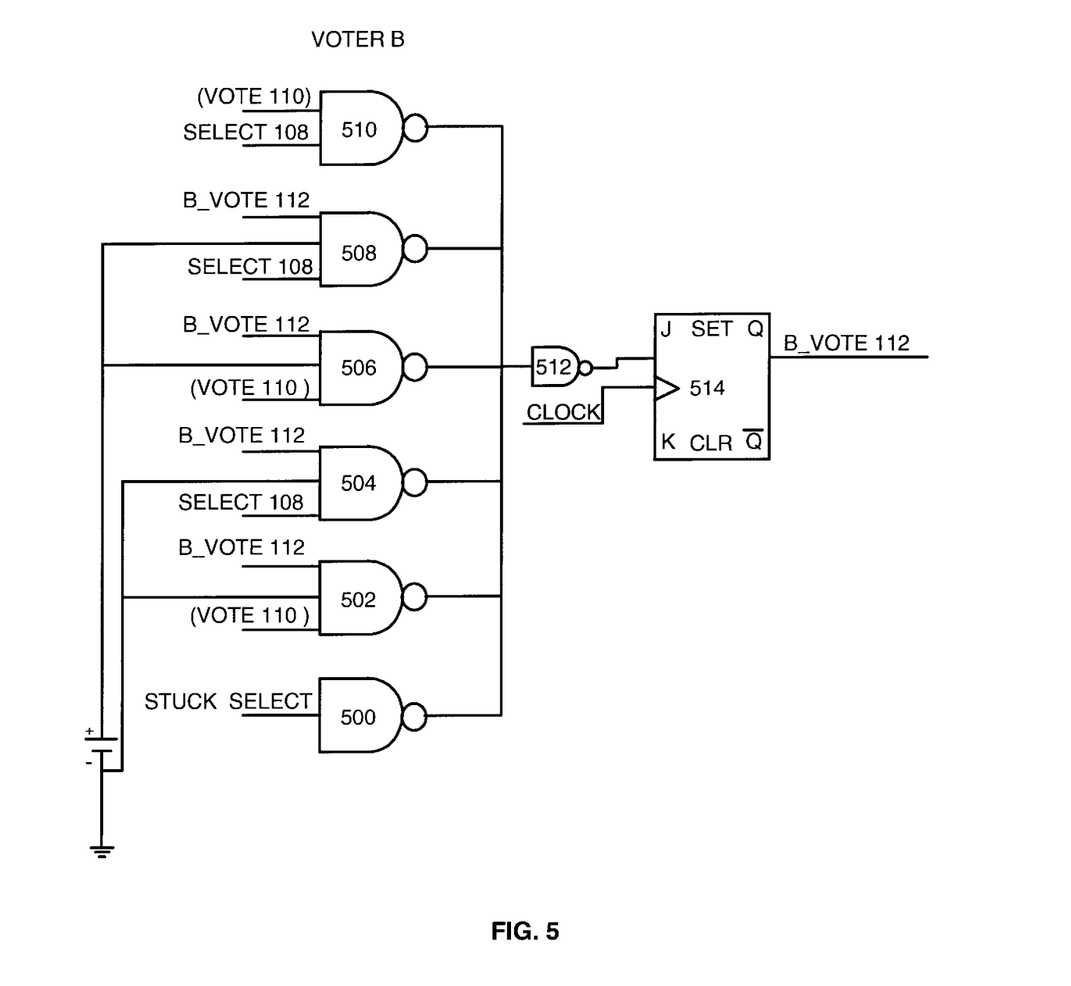

The circuit details of VOTER B are shown in FIG. 5. VOTER B is very similar to VOTER A. The major difference is that because the peripheral units PU-1 to PU-N have no SWITCH input to controller B, the SWITCH 118 input to the VOTER A logic are replaced in VOTER B with an appropriate high or low potential. This allows the same circuit to be used in both VOTER A and VOTER B, while allowing only VOTER A to respond to requests from the peripheral circuits to switch the active controller. In FIG. 5, the NAND gate 500 performs the corresponding function as NAND gate in 300 in FIG. 3. Its input STUCK SELECT is high when interface circuit 122 in VOTER B detects that SELECT 108 is not pulsing at one of the predefined frequencies that represent a 0 or 1 state. In this event, NAND gate 500 sets flip-flop 514, which causes VOTER B to cast its vote for controller A.

NAND gates 502 and 504 are disabled by a low constant voltage supplied by voltage source 516 to one of their inputs.

NAND gate 506 causes VOTER B to vote for controller A whenever controller B's last vote was for controller A (B_VOTE 112 is high) and ERROR LOGIC B concludes that controller A is still functioning properly (FAULT 110 is high).

NAND gate 508 causes VOTER B to vote for controller A whenever controller A is already active (SELECT 108 is pulsing at a frequency representing a high) and VOTER B's last vote was for controller A (B_VOTE 112 is high).

NAND gate 510 causes VOTER B to vote for controller A whenever controller A is already active (SELECT 108 is pulsing at a frequency representing a high) and ERROR LOGIC B concludes that controller A is functioning properly (FAULT 110 is high). In all other cases, flip-flop 514 is reset at clock time, which causes VOTER B to cast a vote for controller B. As described above, the high or low state of B_VOTE 112 is input into pulse generator 114 of controller B, where the state is converted into an interface signal B_VOTE 116 having one of two predefined frequencies that represent the high or low state.

Figure 6:
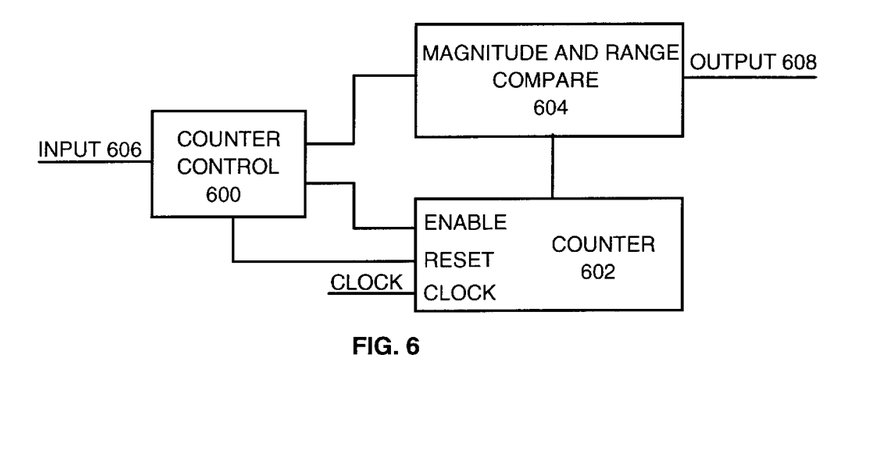
FIG. 6 shows a generic circuit for detecting two different predefined signal frequencies on a signaling path that represent two different signal states.

Since pulsing frequencies are used on the interface leads SELECT 108 and B_VOTE 116, it becomes necessary to detect which frequency is present on any of these leads, or whether an interface lead is in a stuck, non-pulsing state. FIG. 6 shows generic circuitry to accomplish this for each interface lead. In FIG. 6, signals on an INPUT interface lead 606 are inputted to a counter control circuit 600. At a suitable time before the state of an interface lead is needed, counter control 600 resets a counter 602 and then enables it to begin counting pulses on INPUT lead 606. This counting continues for a short interval and then the value stored in counter 602 is evaluated by magnitude and range compare circuit 604. Circuit 604 operates according to predefined ranges of pulse counts to determine if a signal on an interface lead is to be interpreted as a high or low state. If 604 detects a pulse count on INPUT lead 606 that is within a predefined range, it sets it OUTPUT lead 608 to a high state.

Figure 7:
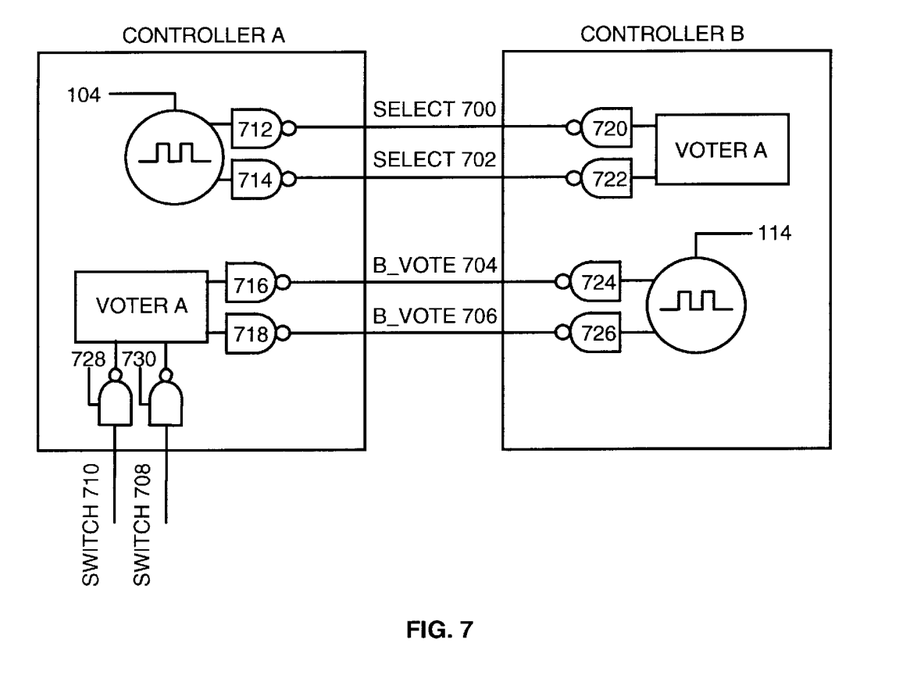
FIG. 7 shows the preferred arrangement of duplicating signal paths and signal path components near the electrical periphery of a circuit module such as a card or chip.

In the preferred embodiment of the invention, the interface signals SELECT 108, B_VOTE 116 and SWITCH 118 are duplicated, including the interface circuitry in each controller at the endpoints of these connections. This preferred embodiment consisting of duplicated interface leads is illustrated in FIG. 7. In this FIG., the output of pulse oscillator 104 in controller A is transmitted to controller B on redundant interface leads SELECT 700 and SELECT 702 by NAND gates 712 and 714. In controller B, NAND gates 720 and 722 receive the signals on SELECT 700 and SELECT 702 and input the signals on these two interface leads into VOTER B. Similarly, NAND gates 724 and 726 send the pulsing signals from pulse oscillator 114 in controller B to controller A via B_VOTE 704 and B_VOTE 706, where these signals are received by NAND gates 716 and 718 for input to VOTER A. The SWITCH leads from the peripheral circuits are also duplicated as shown by the signals on SWITCH 708 and SWITCH 710, which are inputted to VOTER A of controller A. Since it is possible for these duplicated interface leads to acquire inconsistent states, they must be interpreted as to meaning and effect and reduced to single values for use in voting, as described in earlier parts of this specification.

Figure 8:
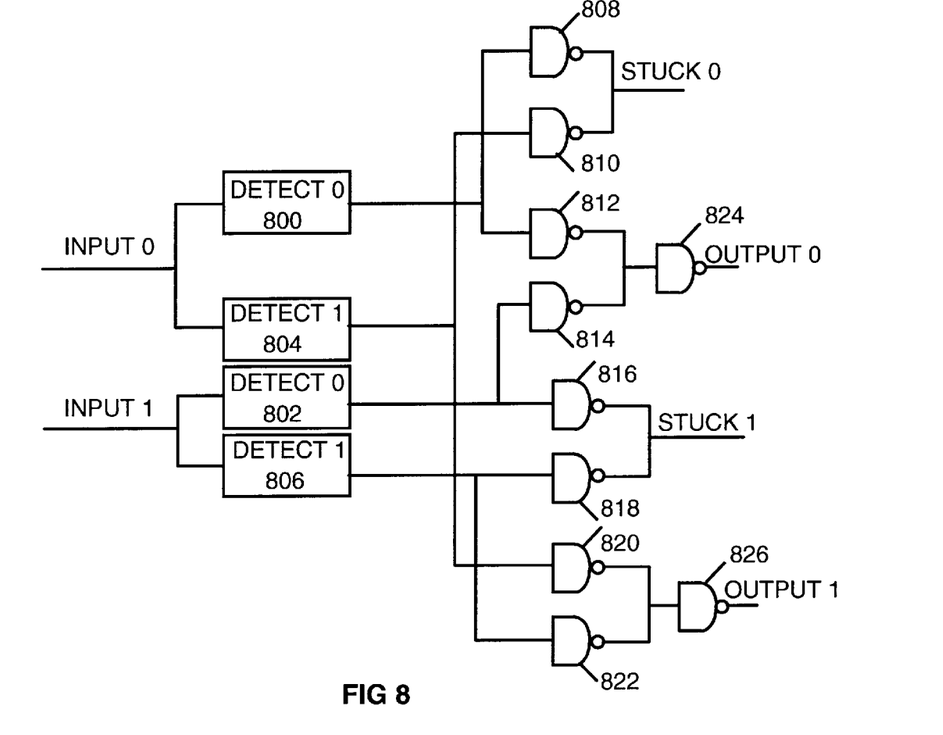
FIG. 8 shows a circuit for interpreting the states that might be present on the duplicate signaling paths of FIG. 7.

In the preferred embodiment, VOTER A of controller A interprets the SWITCH 708, SWITCH 710 and B_VOTE 704 and B_VOTE 706 signals as shown in FIG. 8. Similarly, VOTER B in controller B interprets SELECT 700 and SELECT 702 also according to FIG. 8. FIG. 8 shows a generic circuit which is used to reduce the states on the redundant interface leads to a single signal for internal processing in accordance with earlier teachings. For example, lead INPUT0 might correspond to SELECT 700, SWITCH 708 or B_VOTE 704. Similarly, lead INPUT1 might correspond respectively to SELECT 702, SWITCH 710 or B_VOTE 706. Thus, if the circuitry of FIG. 8 is considered to be connected to the SELECT interface leads of FIG. 7, then INPUT0 corresponds to SELECT 700 AND INPUT1 corresponds to SELECT 702. Similarly in this case, the output leads OUTPUT0 and OUTPUT1 then correspond to the internal signals (not shown) generated by Interface circuit 122 that reflect the pulsing state of interface lead SELECT 108.

In FIG. 8, each of the circuits 800, 802, 804 and 806 represent an instance of the circuit of FIG. 6 and is set to detect one of the two predefined pulsing frequencies on the interface leads. For example, circuits 800 and 802 are set to detect a first one of the predefined frequencies on the two input leads in question. Circuits 804 and 806 are set to detect the second of the predefined frequencies on the input leads. When any of these circuits 800, 802, 804 and 806 detects the appropriate frequency on the respective lead, it sets its output lead to a high state. Thus, for example if either circuit 800 or 802 detects a valid pulsing signal of the first predefined frequency on INPUT0 or INPUT1, then the output lead OUTPUT0 is forced high by gates 812, 814 and 824. If either circuit 804 or 806 detects a valid pulsing signal of the second predefined frequency on INPUT0 or INPUT 1, then the output lead OUTPUT1 is forced high by gates 820, 822 and 826. If no valid predefined pulsing signal is detected on a input lead, such as INPUT0, this is considered to be the detection of a stuck state on that input lead. Thus, if this condition is detected on lead INPUT0, for example, NAND gates 808 and 810 will force the output lead STUCK0 to a high state, meaning that no valid pulsing signal is detected on input lead INPUT0. Similarly, output lead STUCK1 is forced high if circuits 802 and 806 do not detect a valid pulsing signal on input lead INPUT1. In this preferred embodiment of duplicated interface leads, appropriate ones of the leads STUCK0 and STUCK1 would represent lead STUCK B_VOTE in FIG. 3 and STUCK SELECT in FIG. 5.

Figure 9:
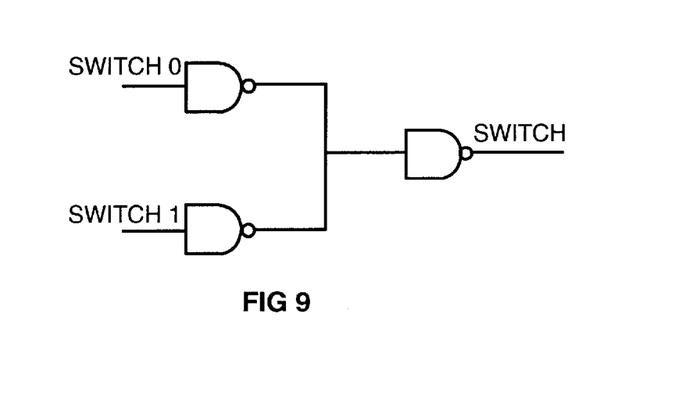
FIG. 9 shows a logic diagram for generating an active controller switch signal from the peripheral units if the signaling path from the peripheral units is also duplicated.

Finally, FIG. 9 shows an illustrative circuit that reduces the signals on redundant interface leads SWITCH 708 and SWITCH 710 to a single signal SWITCH for internal processing according to earlier teachings. Pulsed signaling could also be used on the SWITCH 118 lead, if desired. If it is assumed that pulsed signaling is used on the SWITCH leads, then input lead SWITCH0 refers to output lead OUTPUT0 of FIG. 8, when INPUT0 and INPUT1 of FIG. 8 refers to SWITCH interface leads 708 and 710, respectively. Similarly, input SWITCH1 refers to OUTPUT1 of FIG. 8. The circuit of FIG. 9 is very simple. If either or both of SWITCH0 or SWITCH 1 are high, meaning that a peripheral unit controller switch request is detected on either of the SWITCH interface leads of FIG. 7, then the output SWITCH of FIG. 9 is set high to reflect a switch request to VOTER A.

It is to be understood that the above described arrangements are merely illustrative of the application of principles of the invention and that other arrangements may be devised by workers skilled in the art without departing from the spirit and scope of the invention.

We claim:

1. A method of simulating triple modular controller redundancy in a system comprising first and second controllers, which controllers in a first mode of system operation perform the same data processing operations substantially in synchronization with each other, one of the controllers being an active controller and the other controller being a standby controller, and one or more peripheral units connected to the first and second controllers, said one or more peripheral units being incapable of performing the functions of the first controller or the second controller, comprising the steps of:

monitoring the operation of each controller to detect a suspected fault condition in either of the controllers, generating a first signal that indicates a suspected fault condition of the first controller, generating a second signal that indicates a suspected fault condition of the second controller, detecting a suspected fault condition of the active controller by one of the peripheral units and in response thereto generating a third signal that requests a switch of the active controller, and performing a majority vote on the first, second and third signals to select the active controller.

2. The method of claim 1 wherein the first and second controllers contain first and second error logic circuits and first and second voting circuits, respectively, wherein both of the first and second error logic circuits monitor the operation of both of the first and second controllers to generate the first and second signals and the first error logic circuit monitors the third signal for a request from the peripheral circuits to switch the active controller, said method further comprising the step of switching the standby controller into an active state when either controller votes for the instant standby controller and one of the peripheral units requests a switch of the active controller, or when both of the first and second controllers vote for the instant standby controller.

3. A method of simulating triple modular controller redundancy in a system comprising first and second controllers, which controllers in a first mode of system operation perform the same data processing operations substantially in synchronization with each other, one of the controllers being an active controller and the other controller being a standby controller, and one or more peripheral units connected to the first and second controllers, said one or more peripheral units being incapable of performing the functions of the first controller or the second controller, comprising the steps of:

monitoring of both the first and second controllers for a fault condition;

generating a first signal (102) in the first controller which in a first state indicates a vote for the first controller to be active and in a second state indicates a vote for the second controller to be active;

generating a second signal (110) in the second controller which in a first state indicates a vote for the first controller to be active and in a second state indicates a vote for the second controller to be active;

generating an active controller signal (106) in the first controller which in a first state designates the first controller as the active controller and in a second state designates the second controller as the active controller, generating a request signal (118) by a peripheral unit to switch active and standby controllers in response to a suspected fault of the active controller by the peripheral unit, in the second controller, operating on the second signal and the active controller signal from the first controller to generate a second controller vote signal (112);

in the first controller, operating on the first signal, the signal from the peripheral unit and the second controller vote signal to generate the active controller signal.

4. An arrangement for simulating triple modular controller redundancy in a system comprising first and second controllers, which controllers in a first mode of system operation perform the same data processing operations substantially in synchronization with each other, one of the controllers being an active controller and the other controller being a standby controller, and one or more peripheral units connected to the first and second controllers, said one or more peripheral units being incapable of performing the functions of the first controller or the second controller, the arrangement comprising:

first means in each controller for detecting a suspected fault condition of itself;

second means in each controller for detecting a suspected fault condition of the other controller;

third means in at least one of the peripheral circuits for detecting a suspected fault condition of the active controller; and means responsive to the first, second and third means for performing a majority vote to select the active controller.

5. An arrangement for simulating triple modular controller redundancy in a system comprising first and second controllers, one of the controllers being an active controller and the other controller being a standby controller, and one or more peripheral units connected to the first and second controllers, said one or more peripheral units being incapable of performing the functions of the first controller or the second controller, the arrangement comprising:

first means for detecting a suspected fault condition of the first controller;

second means for detecting a suspected fault condition of the second controller;

third means in at least one of the peripheral circuits for detecting a suspected fault condition of the active controller; and means responsive to the first, second and third means for performing a majority vote to select the active controller.

* * * * *